(12) United States Patent
Sakai

(10) Patent No.: US 8,278,916 B2
(45) Date of Patent: Oct. 2, 2012

(54) ROTATIONAL ANGLE SENSOR, MOTOR, ROTATIONAL ANGLE DETECTOR, AND ELECTRIC POWER STEERING SYSTEM

(75) Inventor: Kazuya Sakai, Kariya (JP)

(73) Assignee: JTEKT Corporation, Osaka (JP)

( * ) Notice: Subject to any disclaimer, the term of this patent is extended or adjusted under 35 U.S.C. 154(b) by 255 days.

(21) Appl. No.: 12/886,054

(22) Filed: Sep. 20, 2010

(65) Prior Publication Data
US 2011/0068780 A1 Mar. 24, 2011

(30) Foreign Application Priority Data
Sep. 24, 2009 (JP) .................................. 2009-218800

(51) Int. Cl.
*G01B 7/30* (2006.01)
(52) U.S. Cl. .............................. 324/207.25; 324/207.21
(58) Field of Classification Search ............. 324/207.25, 324/207.21, 252
See application file for complete search history.

(56) References Cited

U.S. PATENT DOCUMENTS
2009/0206827 A1 8/2009 Aimuta et al.

FOREIGN PATENT DOCUMENTS
| JP | A-11-160099 | 6/1999 |
| JP | A-2003-075108 | 3/2003 |
| JP | B2-4273363 | 6/2009 |

*Primary Examiner* — Bot Ledynh
(74) *Attorney, Agent, or Firm* — Oliff & Berridge, PLC

(57) ABSTRACT

A rotational angle sensor includes: a magnet rotor in which multiple magnetic poles are formed along the circumferential direction of the magnet rotor; and three sensor devices that are arranged on a circle concentric with the magnet rotor at regular angle intervals. Each of the sensor devices includes three half-bridge circuits each of which has a pair of spin valve magnetic resistances that are connected in series in such a manner that the magnetization directions of spin fixed layers of the spin valve magnetic resistances are opposite to each other. Each of the sensor devices is formed in such a manner that phases of the sensor signals output from the respective half-bridge circuits based on a change in magnetic flux caused by the rotation of the magnet rotor are offset from each other by an electrical angle of 120°.

10 Claims, 9 Drawing Sheets

ROTATIONAL ANGLE SENSOR, MOTOR, ROTATIONAL ANGLE DETECTOR, AND ELECTRIC POWER STEERING SYSTEM

INCORPORATION BY REFERENCE

The disclosure of Japanese Patent Application No. 2009-218800 filed on Sep. 24, 2009 including the specification, drawings and abstract is incorporated herein by reference in its entirety.

BACKGROUND OF THE INVENTION

1. Field of the Invention

The invention relates to a rotational angle sensor, a motor that has the rotational angle sensor, a rotational angle detector that has the rotational angle sensor, and an electric power steering system.

2. Description of the Related Art

When a motor is required to rotate smoothly and highly quietly, for example, when a motor is used in an electric power steering system (EPS), the operation of the motor is usually controlled by supplying sinusoidal currents, of which the phases are offset from each other by an electrical angle of 120°, to a U-phase coil, a V-phase coil and a W-phase coil. Therefore, a coil-type resolver that detects a rotational angle with a high degree of accuracy is conventionally used as a motor resolver that serves as a motor rotational angle sensor, as described in, for example, Japanese Patent Application Publication 11-160099 (JP-A-11-160099).

However, it is difficult to downsize a coil-type resolver because the coil-type resolver has coils. As a result, the cost of producing the coil-type resolver is high. In recent years, magnetic rotational angle sensors that detect a rotational angle with a high degree of accuracy and that may replace coil-type resolvers have been suggested.

For example, Japanese Patent Application Publication No. 2003-75108 (JP-A-2003-75108) describes a method for increasing the detection accuracy. According to JP-A-2003-75108, sensor devices are formed using hall elements as sensor elements, the sensor devices are arranged at multiple positions along the circumferential direction of a magnet rotor, and a correction is made using multiple sensor signals output from the sensor devices.

Japanese Patent No. 4273363 describes a rotational angle detector. According to Japanese Patent No. 4273363, full-bridge circuits are formed. Each of the full-bridge circuit includes a pair of spin valve magnetic resistances that are connected in series in such a manner that the magnetization directions of spin fixed layers are opposite to each other. In addition, a sensor device that outputs two-phase sensor signals of which the phases are offset from each other by an electrical angle of 90° based on a change in magnetic flux caused by the rotation of a magnet rotor is formed by providing the two full-bridge circuits. In this example, a full-bridge circuit that uses giant magnetic resistances (GMR) as spin valve magnetic resistances is formed. The two sensor devices thus configured are arranged at positions that are apart from each other by an electrical angle of 90×n° (n is an integral number) in the circumferential direction of the magnet rotor.

If this configuration is employed, the phase of each of the two sensor signals that are different in phase and that are output from one of the sensor devices overlaps with the phase of one of the two sensor signals that are output from the other sensor device. Accordingly, it is possible to remove waveform distortion by averaging the sensor signals of which the phases overlap each other. Then, the rotational angle is detected based on the two-phase resultant signals derived through the averaging process. As a result, it is possible to drastically increase the detection accuracy.

However, even if the above-described configuration is employed, there still remains a problem to be solved. When a magnetic rotational angle sensor is used in a motor resolver, the number of magnetic poles of a magnet rotor is changed depending on the intended use. More specifically, when a high torque is required, a large number of magnetic poles are formed, whereas when a high speed rotation is required, a relatively small number of magnetic poles are formed. The two sensor devices are apart from each other by an electrical angle of n×90°. The positional relationship between the two sensor devices may vary depending on the number of magnetic poles. Therefore, in the existing configuration, the arrangement of the sensor devices needs to be changed when the number of magnetic poles is changed. Accordingly, there is still room for improvement in this regard.

SUMMARY OF INVENTION

It is an object of the invention to provide a magnetic rotational angle sensor which has a simple configuration, which detects the rotational angle with a high degree of accuracy, and in which the number of magnetic poles may be flexibly changed, a motor that has the rotational angle sensor, a rotational angle detector that has the rotational angle sensor, and an electric power steering system.

An aspect of the invention relates to a rotational angle sensor that includes: a magnet rotor in which multiple magnetic poles are formed along the circumferential direction of the magnet rotor; and sensor devices that output sensor signals based on a change in magnetic flux caused by the rotation of the magnet rotor. The three sensor devices are arranged on a circle concentric with the magnet rotor at regular angle intervals. Each of the sensor devices includes three bridge circuits each of which has a pair of spin valve magnetic resistances that are connected in series in such a manner that the magnetization directions of spin fixed layers of the spin valve magnetic resistances are opposite to each other. Each of the sensor devices is formed in such a manner that phases of the sensor signals output from the respective bridge circuits are offset from each other by an electrical angle of 120°.

Each of the bridge circuits of the sensor device, which includes the spin valve magnetic resistances as the sensor elements, may be formed through a semiconductor process. The phase difference between the sensor signals output from the bridge circuits is accurately adjusted to an electrical angle of 120°. Each of the intervals between the sensor devices, arranged on a circle concentric with the magnet rotor at regular intervals of a mechanical angle of 120°, is n×120° in electrical angle regardless of the number of magnetic poles of the magnet rotor.

With the configuration described above, each of the three-phase sensor signals output from each of the sensor devices overlaps with one of the sensor signals output from each of the remaining sensor devices. Then, the sensor signals of which the phases overlap each other are averaged. As a result, it is possible to obtain the three-phase sinusoidal waveforms that are free from distortion and correspond to the rotation of the magnet rotor. As a result, it is possible to more accurately detect the rotational angle with a simple configuration. In addition, it is possible to more flexibly change the number of the magnetic poles. Further, because multiple sensor devices are provided, even if a malfunction occurs in one of the sensor devices, it is possible to continue rotational angle detection based on the sensor signals output from the remaining two sensor devices. As a result, it is possible to improve the reliability.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
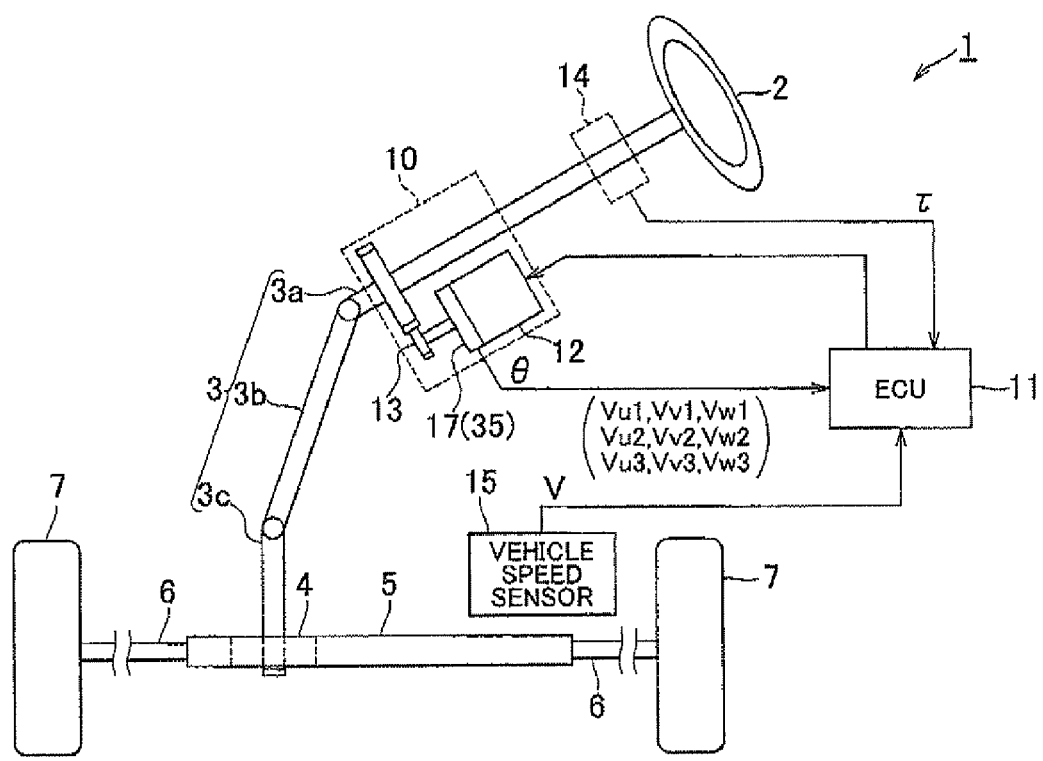
FIG. 1 is a view schematically showing the structure of an electric power steering system.

Hereafter, an embodiment of the invention will be described with reference to the accompanying drawings. As shown in FIG. 1, in an electric power steering system (EPS) 1 according to the embodiment, a steering shaft 3 to which a steering wheel 2 is secured is connected to a rack shaft 5 via a rack-and-pinion mechanism 4. The rotation of the steering shaft 3, caused by a steering operation, is converted into linear reciprocation motion of the rack shaft 5 by the rack-and-pinion mechanism 4. The steering shaft 3 is formed by connecting a column shaft 3a, an intermediate shaft 3b, and a pinion shaft 3c to each other. The linear reciprocation motion of the rack shaft 5, caused by the rotation of the steering shaft 3, is transmitted to knuckles (not shown) via tie-rods 6 connected to respective ends of the rack shaft 5. As a result, the steering angle of steered wheels 7, that is, the direction in which a vehicle travels is changed.

The EPS 1 includes an EPS actuator 10 and an ECU 11. The EPS actuator 10 serves as a steering force assist device that supplies a steering system with an assist force for assisting a steering operation. The ECU 11 serves as a control unit that controls the operation of the EPS actuator 10.

The EPS actuator 10 is a column assist-type EPS actuator in which a motor 12 that serves as a drive source is drivably connected to the column shaft 3a via a speed reduction mechanism 13. An existing worm-and-wheel mechanism is used as the speed reduction mechanism 13. A brushless motor is used as the motor 12. The motor 12 is rotated by three-phase (U, V, W) drive currents from the ECU 11. The EPS actuator 10 reduces the speed of rotation of the motor 12, and transmits the rotation with the reduced speed to the column shaft 3a, thereby supplying the steering system with the motor torque as an assist force.

A torque sensor 14 and a vehicle speed sensor 15 are connected to the ECU 11. The ECU 11 computes the assist force that should be applied to the steering system (target assist force) based on the steering torque $\tau$ detected by the torque sensor 14 and the vehicle speed V detected by the vehicle speed sensor 15. More specifically, the ECU 11 computes the target assist force in such a manner that a larger assist force is applied to the steering system as the absolute value of the detected steering torque $\tau$ is larger and as the vehicle speed V is lower.

The ECU 11 detects the rotational angle (electrical angle) $\theta$ of the motor 12 based on a sensor signal output from a motor resolver 17 provided in the motor 12. In the embodiment, the motor resolver 17 (a rotational angle sensor 35 described later in detail) and the ECU 11 constitute a rotational angle detector. Sinusoidal currents are supplied to the respective phases of the motor 12 based on the detected rotational angle $\theta$ so that a motor torque that corresponds to the target assist force is generated. Thus, the operation of the EPS actuator 10 that uses the motor 12 as the drive source, that is, the assist force that is applied to the steering system is controlled.

Figure 2:
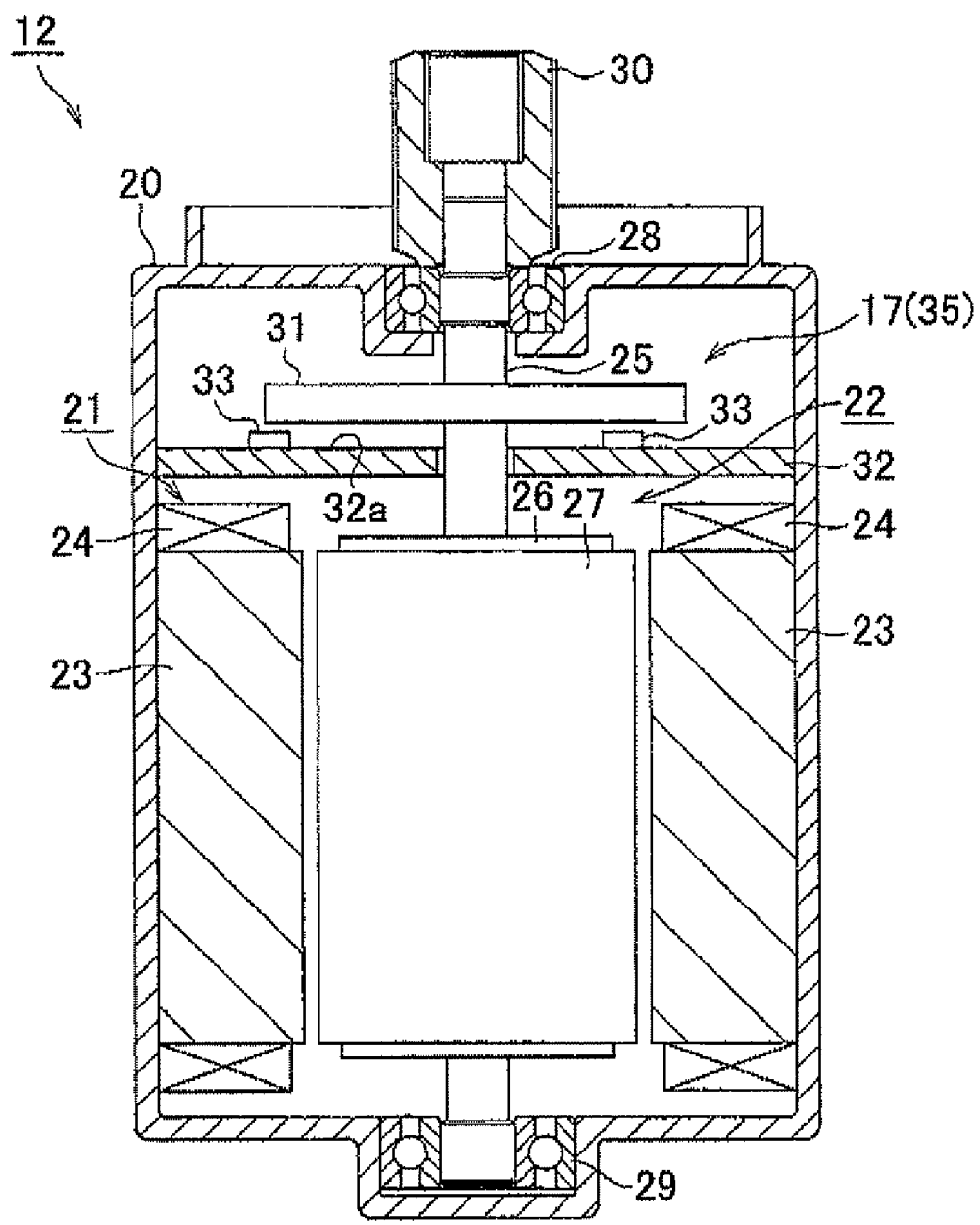
FIG. 2 is a view schematically showing the structure of a motor.

Next, the structures of the motor and the rotational angle sensor used as the motor resolver according to the embodiment will be described. As shown in FIG. 2, the motor 12 includes a stator 21 that is secured to the inner periphery of a housing 20 having a substantially cylindrical shape, and a rotor 22 that is rotatably supported at a position further inward than the stator 21 in the radial direction.

The stator 21 is formed by wounding motor coils 24 around a plurality of teeth 23 that extend radially inward from the inner periphery of the housing 20. The rotor 22 is formed by securing a magnet on the outer periphery of a motor core 26 that rotates together with a rotary shaft 25. More specifically, the rotor 22 is formed by fitting a ring magnet 27, in which magnetic poles that are opposite in polarity (S/N) are alternately formed in the circumferential direction of the ring magnet 27, on the motor core 26. The rotary shaft 25 is supported by bearings 28 and 29 fitted to the housing 20. As a result, the rotor 22 is rotatably supported at a position further inward than the stator 21 in the radial direction.

In the motor 12 that is formed as a brushless motor, when a rotating magnetic field is formed on the stator 21—side due to supply of currents to the motor coil 24, the rotor 22 is rotated based on the relationship between the rotating magnetic field and a magnetic field flux formed by the ring magnet 27. In the motor 12, one end of the rotary shaft 25 projects outward from the housing 20, whereby an output portion 30 is formed. The motor torque generated by the rotation of the rotor 22 is output from the motor 12 through the output portion 30.

An annular magnet rotor 31 that serves as a magnet rotor is secured to the rotary shaft 25. The magnet rotor 31 is arranged at a position closer to the output portion 30 than the motor core 26 in the axial direction (at a position above the motor core 26 in FIG. 2). The motor resolver 17 detects the rotational angle θ of the motor 12 based on a change in the magnetic flux caused when the magnet rotor 31 rotates together with the rotary shaft 25.

More specifically, an electronic circuit substrate 32 is housed in the housing 20, at a position between the motor core 26 and the magnet rotor 31 in the axial direction of the housing 20. Sensor devices 33 are provided on the electronic circuit substrate 32 (on a fit face 32a that faces upward in FIG. 2). Each sensor device 33 outputs a sensor signal that corresponds to a change in the magnetic flux as the magnet rotor 31 provided so as to face the electronic circuit substrate 32 rotates.

Figure 3A:
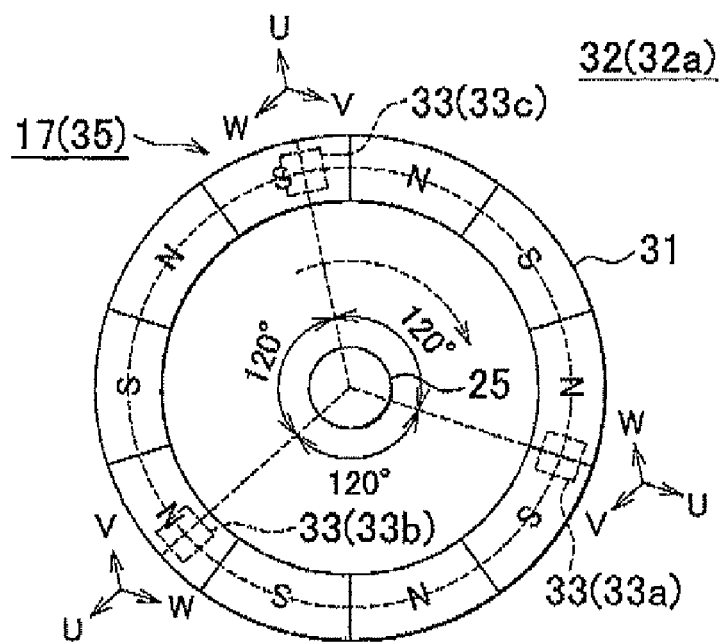
FIG. 3A is a plan view of a motor resolver (rotational angle sensor)
Figure 3B:
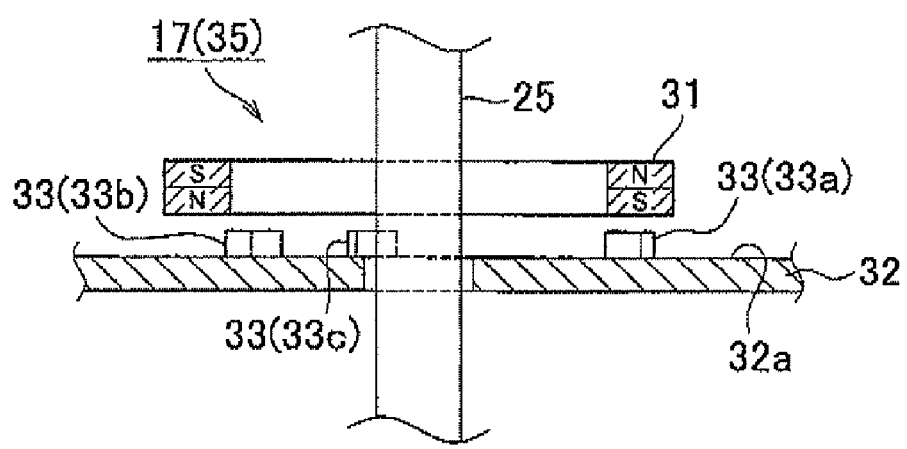
FIG. 3B is a cross-sectional view of the motor resolver (rotational angle sensor)

More specifically, as shown in FIGS. 3A and 3B, magnetic poles that are opposite in polarity (N/S) are alternately formed in the annular magnet rotor 31 having a predetermined radial width, along the circumferential direction of the magnet rotor 31. The number of magnetic poles of the magnet rotor 31, including both the N-poles and the S-poles, is set to "10". In FIGS. 3A and 3B, for convenience of explanation, a member that supports the magnet rotor 31 in such a manner that the magnet rotor 31 rotates together with the rotary shaft 25 is omitted.

Three sensor devices 33a, 33b and 33c are arranged on the electronic circuit substrate 32 at regular angle intervals of 120°. The sensor devices 33a, 33b and 33c are provided on a circle (concentric circle L indicated by a dashed line in FIG. 3A) concentric with the magnet rotor 31 that is arranged so as to face the fit face 32a of the electronic circuit substrate 32. More specifically, each of the sensor devices 33a, 33b and 33c is arranged at a position that corresponds to substantially the center of the magnet rotor 31 in the radial direction. In the motor 12, the magnet rotor 31 and the sensor devices 33 (33a, 33b, 33c) constitute the magnetic rotational angle sensor 35 that forms the motor resolver 17.

More specifically, each of the sensor devices 33 (33a, 33b, 33c) outputs sensor signals that change sinusoidally with the rotation of the magnet rotor 31 arranged so as to face the sensor devices 33, using, as a sensor element, a bridge circuit that has a pair of spin valve magnetic resistances that are connected in series in such a manner that the directions of the spin fixed layers are opposite to each other.

Figure 4A:
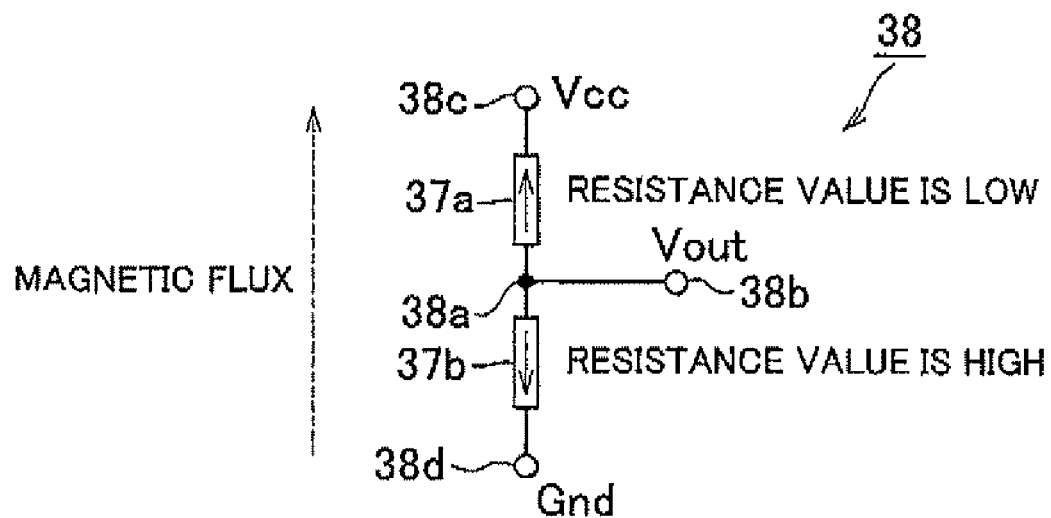
FIG. 4A is a view illustrating the structure of a half-bridge circuit that includes a pair of spin valve magnetic resistances and an action of the half-bridge circuit that serves as a sensor element.
Figure 4B:
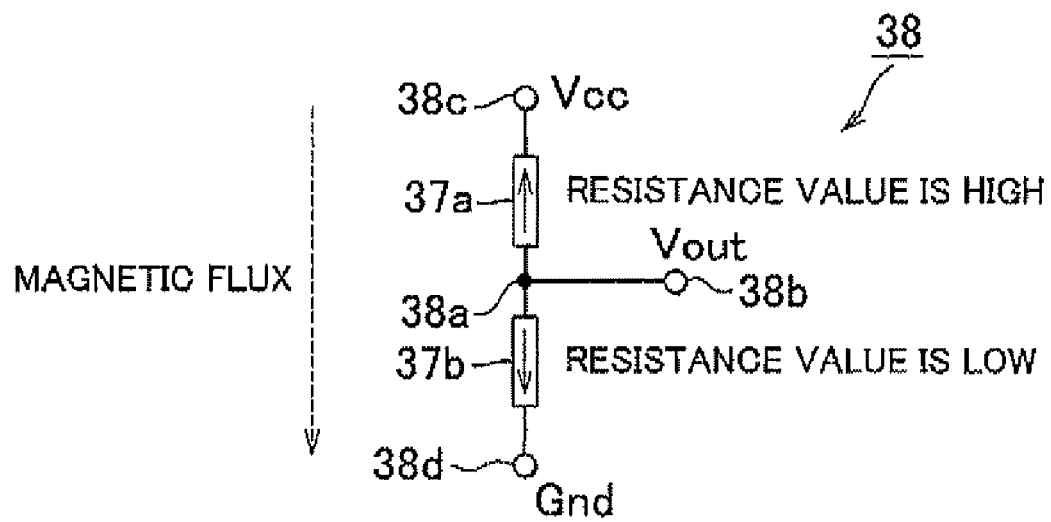
FIG. 4B is a view illustrating the structure of a half-bridge circuit that includes a pair of spin valve magnetic resistances and an action of the half-bridge circuit that serves as a sensor element.

The resistance valve of the spin valve magnetic resistance changes when the magnetization direction of the spin free layer changes with respect to the fixed magnetization direction of the spin fixed layer based on the direction of magnetic flux that passes through the spin valve magnetic resistance. More specifically, the resistance value of the spin valve magnetic resistance decreases with an increase in the degree of coincidence between the direction of the magnetic flux that passes through the spin valve magnetic resistance and the magnetization direction of the spin fixed layer. As shown in FIGS. 4A and 4B, paired spin valve magnetic resistances 37a and 37b are connected in series in such a manner that the magnetization directions of the spin fixed layers (directions indicated by arrowed solid lines in FIGS. 4A and 4B) are opposite to each other to form a half-bridge circuit 38. As a result, the voltage at a connection point 38a is a divided voltage based on the resistance values of the spin valve magnetic resistances 37a and 37b.

That is, when the resistance values of the two spin valve magnetic resistances 37a and 37b that constitute the half-bridge circuit 38 change depending on the direction of the magnetic flux that passes through the spin valve magnetic resistances 37a and 37b, the voltage at the connection point 38a also changes. The voltage at the connection point 38a is output from an output terminal 38b as a sensor signal. Thus, the half-bridge circuit 38 functions as a sensor element.

More specifically, in the half-bridge circuit 38 shown in FIGS. 4A and 4B, the spin valve magnetic resistance 37a on a supply terminal 38c-side is arranged in such a manner that the magnetization direction of the spin fixed layer is the direction from the connection point 38a toward the supply terminal 38c. Therefore, the resistance valve of the spin valve magnetic resistance 37a reaches a minimum when the direction of the magnetic flux that passes through the spin valve magnetic resistance 37a (direction indicated by an arrowed dashed line) coincides with the direction from an earth terminal 38d toward the supply terminal 38c, as shown in FIG. 4A.

The spin valve magnetic resistance 37b on the earth terminal 38d-side is arranged in such a manner that the magnetization direction of the spin fixed layer is the direction from the connection point 38a toward the earth terminal 38d. Therefore, the resistance value of the spin valve magnetic resistance 37b reaches a minimum when the direction of the magnetic flux that passes through the spin valve magnetic resistance 37b is the direction from the supply terminal 38c toward the earth terminal 38d, as shown in FIG. 4B.

Accordingly, the level of the sensor signal (output voltage) that is output from the half-bridge circuit 38 reaches a maximum when the direction of the magnetic flux that passes through the spin valve magnetic resistances 37a and 37b is the direction shown in FIG. 4A (upward direction in FIG. 4A), and reaches a minimum when the direction of the magnetic flux that passes through the spin valve magnetic resistances 37a and 37b is the direction shown in FIG. 4B (downward direction in FIG. 4B).

In the rotational angle sensor 35, the sensor devices 33 (33a, 33b, 33c) each of which has the half-bridge circuit 38 are arranged on a circle concentric with the magnet rotor 31 as described above (see FIG. 3A). When the direction of the magnetic flux that passes through the half-bridge circuit 38 rotates as the magnet rotor 31 rotates, each of the sensor devices 33 (33a, 33b, 33c) outputs sensor signals that sinusoidally change.

Figure 5:
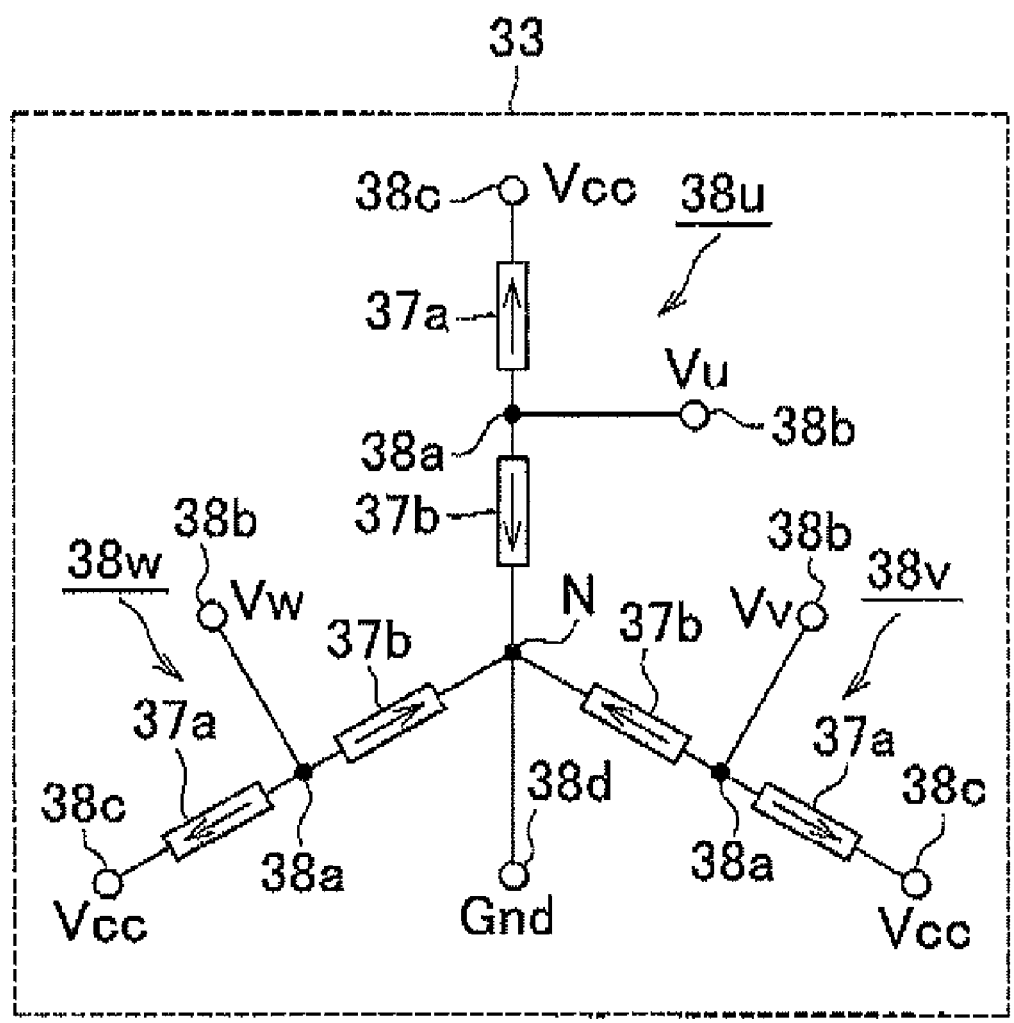
FIG. 5 is a view schematically showing the structure of a sensor device.

More specifically, as shown in FIG. 5, the sensor device 33 includes three half-bridge circuits 38u, 38v and 38w each of which has the structure similar to that of the half-bridge circuit 38 shown in FIGS. 4A and 4B.

Three-phase connection among one ends of the spin valve magnetic resistances 37b of the half-bridge circuits 38u, 38v and 38w, which are arranged on the earth terminal 38d-side, is established through star-connection. The half-bridge circuits 38u, 37v and 38w are arranged centering on the connection point N at regular angle intervals)(120°. Thus, the phases of the sensor signals Vu, Vv and Vw output from the half-bridge circuits 38u, 38v and 38w, respectively, are offset from each other by an electrical angle of 120°.

In each of the half-bridge circuits 38u, 38v and 38w, tunnel magnetic resistances (TMR) are used as the paired spin valve magnetic resistances 37 and 37b. In the sensor device 33, the half-bridge circuits 38u, 38v and 38w are formed through a semiconductor process.

Figure 6A:
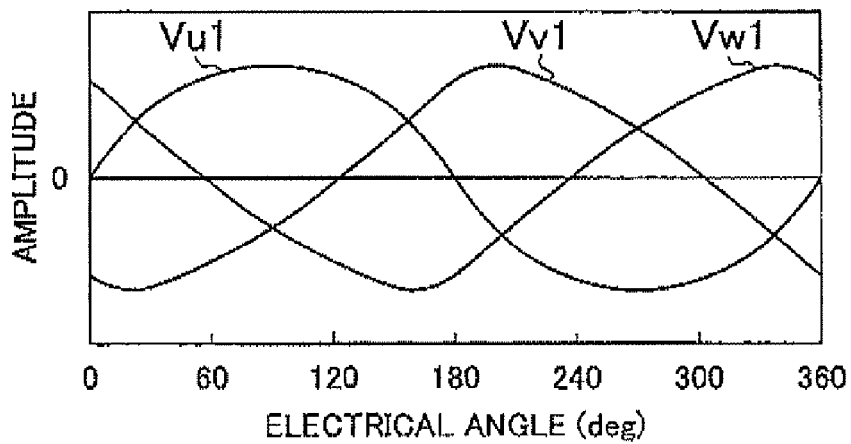
FIG. 6A is a diagram showing waveforms of three-phase sensor signals that are output from a sensor device.
Figure 6B:
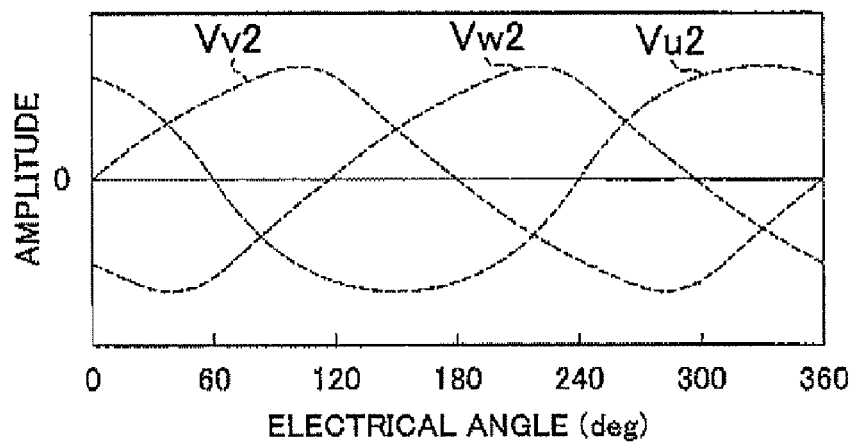
FIG. 6B is a diagram showing waveforms of three-phase sensor signals that are output from a sensor device.
Figure 6C:
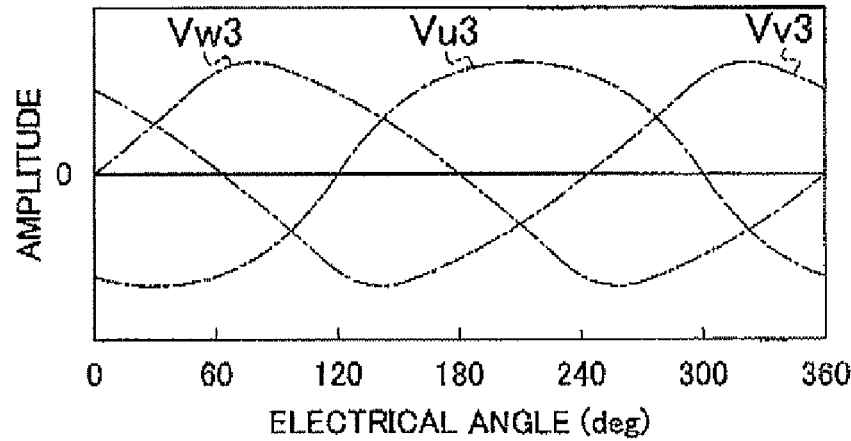
FIG. 6C is a diagram showing waveforms of three-phase sensor signals that are output from a sensor device.

As shown in FIG. 3A, the sensor devices 33a, 33b and 33c are arranged on the electronic circuit substrate 32 in such a manner that the direction in which the half-bridge circuit 38u linearly extends coincides with the radially outward direction of the magnet rotor 31. The direction in which the half-bridge circuit 38u extends in this case is the direction from the connection point N toward the supply terminal 38c in the half-bridge circuit 38u shown in FIG. 5. The phases of the three-phase sensor signals (Vu1, Vv1, Vw1) (Vu2, Vv2, Vw2) (Vu3, Vv3, Vw3) output from the sensor devices 33a, 33b and 33c of the rotational angle sensor 35 are offset from each other by an electrical angle of n×120° (n is an integral number), as shown in FIGS. 6A, 6B and 6C.

As shown in FIG. 3A, when the magnet rotor 31 rotates in the clockwise direction, if the sensor device 33a is used as a reference, the remaining sensor devices 33b and 33c are offset from the sensor device 33a by a mechanical angle of 120° and a mechanical angle of 240°, respectively, from the sensor device 33a in the forward rotational direction. Therefore, each of the intervals between the sensor devices 33a, 33b and 33c is n×120° in electrical angle regardless of the number of magnetic poles of the magnet rotor 31. Accordingly, the phases of the sensor signals Vu2, Vv2, and Vw2 output from the sensor device 33b and the phases of the sensor signals Vu3, Vv3 and Vw3 output from the sensor device 33c are offset from the phases of the sensor signals Vu1, Vv1 and Vw1 output from the sensor device 33a, respectively, by an electrical angle of n×120°, as shown in FIGS. 6A, 6B and 6C.

The sensor signals Vu1, Vv1, Vw1, Vu2, Vv2, Vw2, Vu3, Vv3 and Vw3 are input in the ECU 11. Then, the ECU 11 detects the rotational angle θ of the motor 12 based on these sensor signals.

Next, a method for detecting the rotational angle θ with the use of the ECU 11 according to the embodiment will be described.

As described above, the phases of the sensor signals Vu1, Vv1 and Vw1 output from the sensor device 33a, the phases of the sensor signals Vu2, Vv2 and Vw2 output from the sensor device 33b, and the phases of the sensor signals Vu3, Vv3 and Vw3 output from the sensor device 33c are offset from each other, respectively, by an electrical angle of n×120°.

Figure 7:
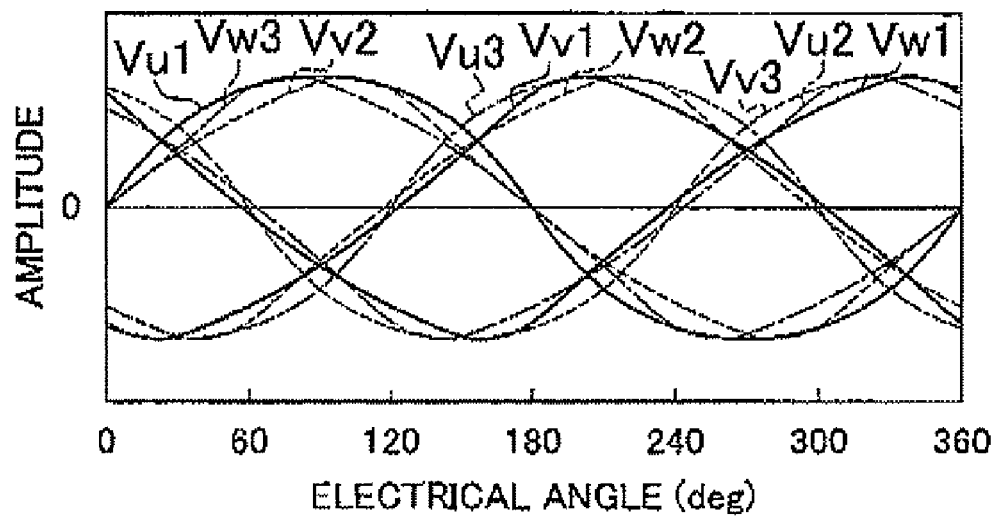
FIG. 7 is a waveform diagram showing the overlaps of the phases of the sensor signals output from the sensor devices.

As shown in FIG. 7, the phase of each of the three-phase sensor signals output from each of the sensor devices 33a, 33b and 33c is overlapped with the phase of one of the sensor signals output from each of the remaining sensor devices.

More specifically, the phase of the U-phase sensor signal (Vu1) output from the sensor device 33a overlaps with the phase of the V-phase sensor signal (Vv2) output from the sensor device 33b and the phase of the W-phase sensor signal (Vw3) output from the sensor device 33c. The phase of the V-phase sensor signal (Vv1) output from the sensor device 33a overlaps with the phase of the W-phase sensor signal (Vw2) output from the sensor device 33b and the phase of the U-phase sensor signal (Vu3) output from the sensor device 33c. The phase of the W-phase sensor signal (Vw1) output from the sensor device 33a overlaps with the phase of the W-phase sensor signal (Vu2) output from the sensor device 33b and the phase of the V-phase sensor signal (Vv3) output from the sensor device 33c.

Figure 8:
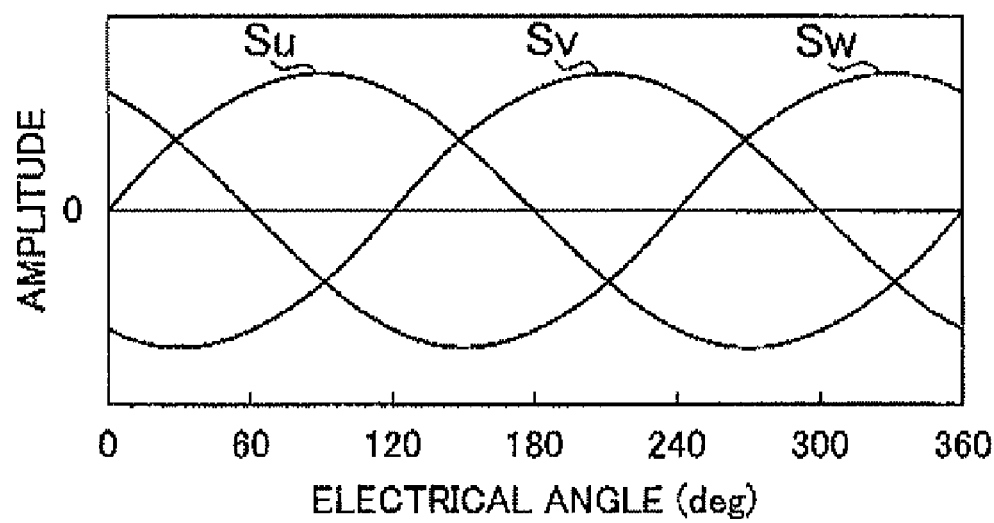
FIG. 8 is a diagram showing waveforms of resultant signals derived by averaging the signals of which the phases overlap each other to remove waveform distortion.

The ECU 11 that constitutes the rotational angle detector classifies the sensor signals Vu1, Vv1, Vw1, Vu2, Vv2, Vw2, Vu3, Vv3 and Vw3 received from the motor resolver 17 (rotational angle sensor 35) into groups of sensor signals. The phases of the sensor signals in the same group overlap each other. The sensor signals of which the phases overlap each other are averaged according to Equations 1 to 3. As a result, the three-phase resultant signals Su, Sv and Sw that are free from waveform distortion are derived, as shown in FIG. 8.

$$Su=(Vu1+Vv2+Vw3)/3 \qquad \text{Equation 1}$$

$$Sv=(Vv1+Vw2+Vu3)/3 \qquad \text{Equation 2}$$

$$Sw=(Vw1+Vu2+Vv3)/3 \qquad \text{Equation 3}$$

In the magnetic rotational angle sensor, distortion of an output waveform due to, for example, distortion of air-gap density distribution of magnetic flux formed by the magnet rotor or variation in the temperature characteristics between the magnetic detection elements that constitute the sensor element becomes a problem. Therefore, the signals of which the phases overlap each other are averaged to remove the distortion of the waveforms. Then, the rotational angle θ of the motor 12 (rotary shaft 25) is computed based on the three resultant signals Su, Sv and Sw derived through the averaging process.

More specifically, the amplitude A of the resultant signals Su, Sv and Sw is computed according to Equation 4

$$A=\sqrt{(2/3)\times(Su^2+Sv^2+Sw^2)} \qquad \text{Equation 4}$$

In Equation 4, "^2" signifies "square".

The ECU 11 computes the rotational angle θ of the motor 12 by solving Equations 5 to 7 based on the amplitude A obtained by Equation 4 and the values of the resultant signals Su, Sv and Sw.

$$Su=A\times\text{SIN}(\theta) \qquad \text{Equation 5}$$

$$Sv=A\times\text{SIN}(\theta+\tfrac{2}{3}\pi) \qquad \text{Equation 6}$$

$$Sw=A\times\text{SIN}(\theta+\tfrac{4}{3}\pi) \qquad \text{Equation 7}$$

The ECU 11 determines whether a malfunction has occurred in each of the sensor devices 33a, 33b and 33c by monitoring the root-mean-square B obtained by Equation 8 in which the three-phase sensor signals Vu, Vv and Vw output from the sensor device are used.

$$B=\sqrt{(Vu^2+Vv^2+Vw^2)} \qquad \text{Equation 8}$$

When a malfunction occurs in one of the sensor devices, the sensor signals Vu, Vv and Vw output from the remaining two sensor devices are used. As a result, detection of the rotational angle is continued.

According to the embodiment, the following effects are obtained.

1) The rotational angle sensor 35 includes the magnet rotor 31 in which multiple magnetic poles are formed along its circumferential direction, and the three sensor devices 33 (33a, 33b, 33c) that are arranged on a circle concentric with the magnet rotor 31 at regular angle intervals. Each sensor device 33 includes the three half-bridge circuits 38 (38u, 38v, 38w) each of which has the paired spin valve magnetic resistances 37a and 37b that are connected in series in such a manner that the magnetization direction of the spin fixed layers are opposite to each other. Each sensor device 33 is formed in such a manner that the phases of the sensor signals Vu, Vv and Vw, output from the respective half-bridge circuits 38 based on a change in the magnetic flux caused by the rotation of the magnet rotor 31, are offset from each other by an electrical angle of 120°.

Each of the half-bridge circuits 38 (38u, 38v, 38w) of the sensor device 33, which includes the spin valve magnetic resistances 37a and 37b as the sensor elements, may be formed through a semiconductor process. The phase difference between the sensor signals Vu, Vv and Vw output from the half-bridge circuits 38 is accurately adjusted to an electrical angle of 120°. Each of the intervals between the sensor devices 33a, 33b and 33c, arranged on a circle concentric with the magnet rotor 31 at regular intervals of a mechanical angle of 120°, n is ×120° in electrical angle regardless of the number of magnetic poles of the magnet rotor 31.

Therefore, with the configuration described above, each of the three-phase sensor signals output from each of the sensor devices 33a, 33b and 33c overlaps with one of the sensor signals output from each of the remaining sensor devices. Then, the sensor signals of which the phases overlap each other are averaged. As a result, it is possible to obtain the three-phase sinusoidal waveforms that are free from distortion and correspond to the rotation of the magnet rotor 31. As a result, it is possible to more accurately detect the rotational angle with a simple configuration. In addition, it is possible to more flexibly change the number of the magnetic poles. Further, because multiple sensor devices are provided, even if a malfunction occurs in one of the sensor devices 33a, 33b and 33c, it is possible to continue rotational angle detection based on the sensor signals output from the remaining two sensor devices. As a result, it is possible to improve the reliability.

2) The tunnel magnetic resistances (TMR) are used as the spin valve magnetic resistances 37a and 37b that constitute the sensor element.

With the configuration described above, it is possible to achieve sufficient signal intensity without using a full-bridge circuit as the bridge circuit used as the sensor element. Thus, it is possible to simplify the configuration. In addition, it is possible to detect the rotational angle more accurately than when giant magnetroresistances (GMR) are used as the spin valve magnetic resistances.

The embodiment described above may be modified as follows.

In the embodiment described above, the invention is applied to the rotational angle sensor 35 that constitutes the motor resolver 17 provided for the motor 12 for the EPS. However, the invention may be applied to rotational angle sensors other than a motor resolver. In addition, the EPS to which the invention is applied is not limited to a column-assist type EPS, for example, the EPS 1 in above-described embodiment. The invention may be applied to other types of EPS, for example, a rack-assist type EPS and a pinion-assist type EPS.

In the embodiment described above, the tunnel magnetic resistances (TMR) are used as the spin valve magnetic resistances 37a and 37b that constitute the sensor element. Alternatively, giant magnetroresistances (GMR) may be used as the spin valve magnetic resistances 37a and 37b.

In the embodiment described above, in each of the half-bridge circuits 38 (38u, 38v, 38w), the spin valve magnetic resistance 37a on the supply terminal 38c-side is arranged in such a manner that the magnetization direction of the spin fixed layer is the direction from the connection point 38a toward the supply terminal 38c. The spin valve magnetic resistance 37b on the earth terminal 38d-side is arranged in such a manner that the magnetization direction of the spin fixed layer is the direction from the connection point 38a toward the earth terminal 38d.

Figure 9:
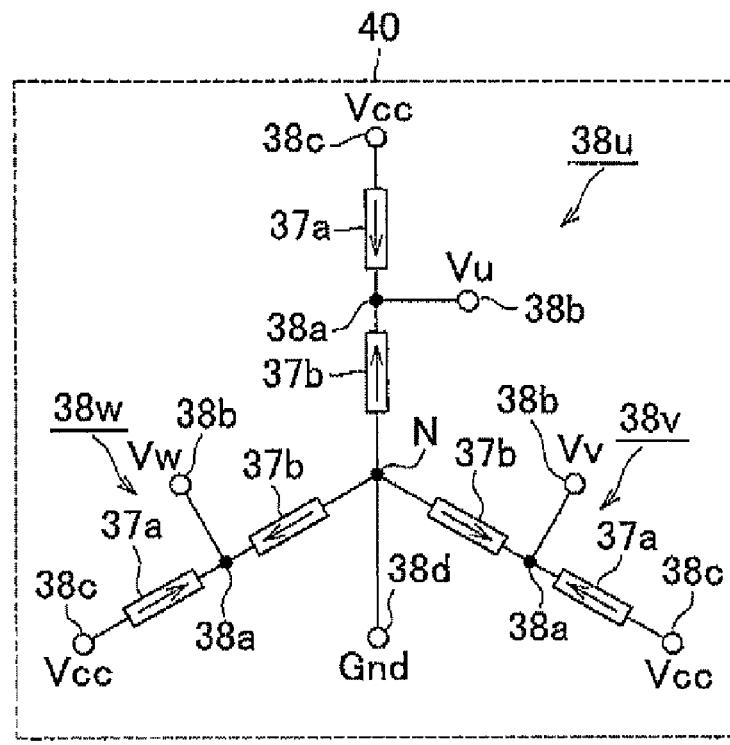
FIG. 9 is a view schematically showing the structure of a sensor device in another example.

However, the arrangement of the spin valve magnetic resistances 37a and 37b is not limited to this, as long as the magnetization directions of the spin fixed layers of the spin valve magnetic resistances 37a and 37b are opposite to each other. The spin valve magnetic resistances 37a and 37b that constitute each of the half-bridge circuits 38 (38v, 38u, 38w) may be arranged in such a manner that the magnetization directions of the spin fixed layers are the directions toward the connection point 38a, for example, as in a sensor device 40 shown in FIG. 9.

Figure 10:
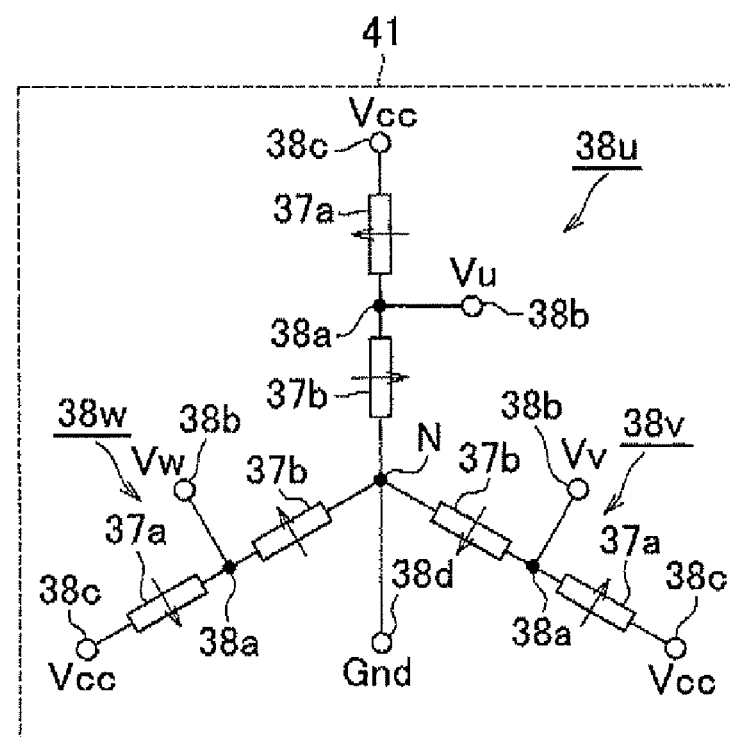
FIG. 10 is a view schematically showing the structure of a sensor device in another example.

As in a sensor device 41 shown in FIG. 10, the magnetization directions of the spin fixed layers of the spin valve magnetic resistance 37a and 37b may be perpendicular to the direction in which each of the half-bridges (38u, 38v, 38w) extends (direction from the connection point N toward the supply terminal 38c).

In the embodiment described above, the sensor devices 33 are formed using the half-bridge circuits 38 (38u, 38v, 38w) as the sensor elements. Alternatively, the sensor devices may be formed using the full-bridge circuits as the sensor elements. It is possible to increase the signal intensity by using full-bridge circuits 38uu, 38vv, 38ww as the sensor elements. Thus, it is possible to further increase the detection accuracy.

Figure 11:
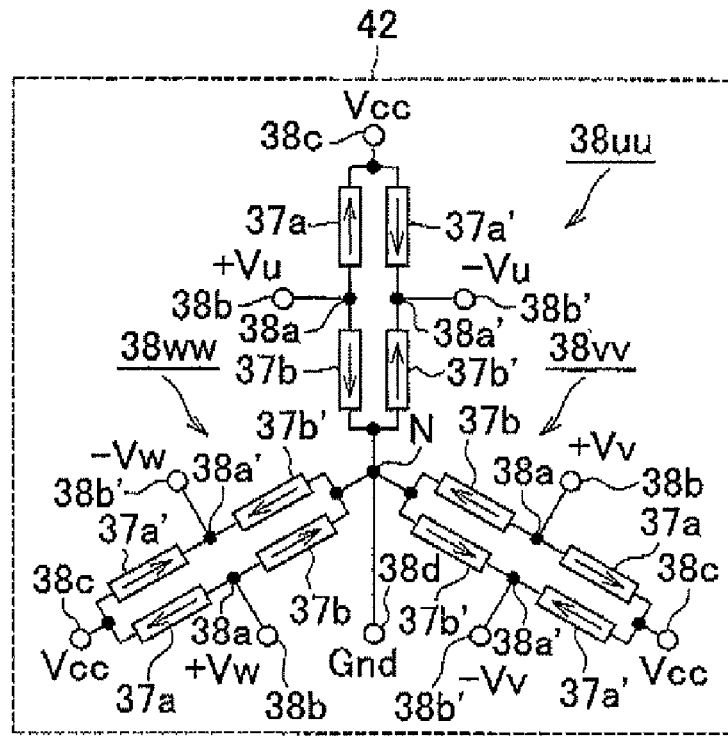
FIG. 11 is a view schematically showing the structure of a sensor device in another example.

More specifically, in a sensor device 42 shown in FIG. 11, each of the three full-bridge circuits 38uu, 38vv and 38ww is formed by connecting a series circuit formed of the spin valve magnetic resistance 37a and 37b and a series circuit formed of spin valve magnetic resistances 37a' and 37b' in parallel with each other. In addition, in each of the full-bridge circuits 38uu, 38vv and 38ww, the spin valve magnetic resistances 37a and 37a' and the spin valve magnetic resistances 37b and 37b' arranged in parallel with each other are arranged in such a manner that the magnetization directions of the spin fixed layers are opposite to each other in the direction in which each series circuit extends (direction from the connection point N toward the supply terminal 38c in FIG. 12). In this example, each of the full-bridge circuits 38uu, 38vv and 38ww outputs, as a sensor signal, the differential output of the two output terminals 38b and 38b' that extend from the connection points 38a and 38a' of the respective series circuits.

Figure 12:
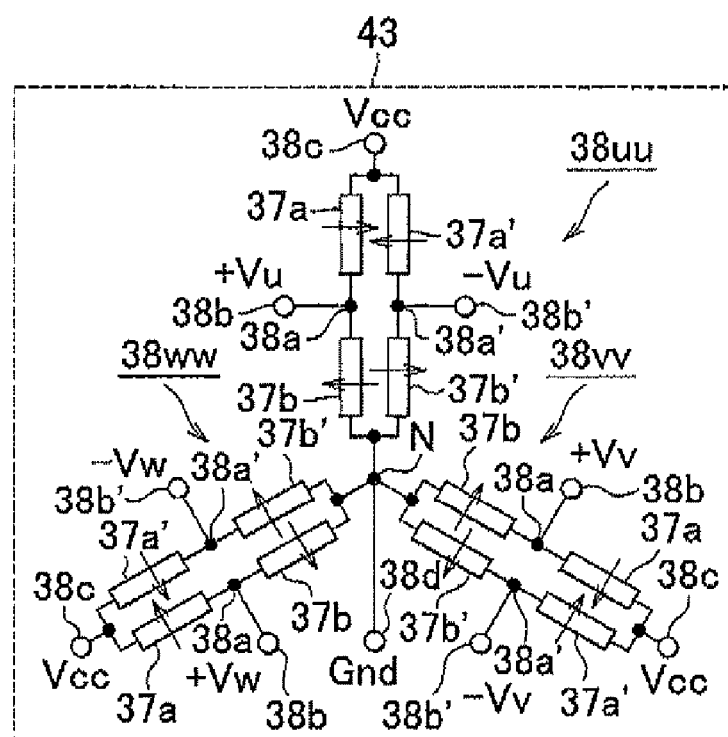
FIG. 12 is a view schematically showing the structure of a sensor device in another example.

The spin valve magnetic resistances 37a, 37b, 37a' and 37b' that constitutes each of the full-bridge circuits 38uu, 38vv and 38ww may be arranged in such a manner that the magnetization directions of the spin fixed layers are perpendicular to the directions in which the series circuits extend (directions from the connection point N toward the supply terminals 38c in FIG. 12).

Next, the technical concept ascertained from the embodiment described above will be described.

There is provided a rotational angle sensor that includes: a magnet rotor in which multiple magnetic poles are formed along the circumferential direction of the magnet rotor; and three sensor devices that are arranged on a circle concentric with the magnet rotor at regular angle intervals. Each of the sensor devices includes three bridge circuits each of which has a pair of spin valve magnetic resistances that are connected in series in such a manner that the magnetization directions of spin fixed layers of the spin valve magnetic resistances are opposite to each other. Each of the sensor devices is formed in such a manner that phases of the sensor signals output from the respective bridge circuits based on a change in magnetic flux caused by the rotation of the magnet rotor are offset from each other by an electrical angle of 120°. According to a rotational angle detection method, the rotational angle of a rotary shaft that rotates together with the magnet rotor is detected with the use of the rotational angle sensor. The sensor signals output from the sensor devices are classified into groups of sensor signals. The phases of the sensor signals in the same group overlap each other. The rotational angle is detected based on the three-phase resultant signals that are derived by averaging the sensor signals of which the phases overlap each other. Thus, it is possible to detect the rotational angle with a high degree of accuracy with a simple configuration. In addition, it is possible to flexibly change the number of magnetic poles.

What is claimed is:

1. A rotational angle sensor, comprising:
a magnet rotor in which multiple magnetic poles are formed along a circumferential direction of the magnet rotor; and
three sensor devices that output sensor signals based on a change in magnetic flux caused by rotation of the magnet rotor, wherein the three sensor devices are arranged on a circle concentric with the magnet rotor at regular angle intervals, and wherein each of the sensor devices includes three bridge circuits each of which has a pair of spin valve magnetic resistances that are connected in series in such a manner that magnetization directions of spin fixed layers of the spin valve magnetic resistances are opposite to each other, and each of the sensor devices is formed in such a manner that phases of the sensor signals output from the respective bridge circuits are offset from each other by an electrical angle of 120°.

2. The rotational angle sensor according to claim 1, wherein each of the spin valve magnetic resistances is a tunnel magnetic resistance.

3. The rotational angle sensor according to claim 1, wherein each of the bridge circuits is a half-bridge circuit.

4. A motor, comprising the rotational angle sensor according to claim 1.

5. A rotational angle detector, comprising:
the rotational angle sensor according to claim 1, and
a detector that detects a rotational angle of a rotary shaft that rotates together with the magnet rotor based on the sensor signals received from the rotational angle sensor,
wherein the detector detects the rotational angle based on three-phase resultant signals derived by averaging the sensor signals of which the phases overlap each other and which are received from the rotational angle sensor.

6. An electric power steering system, comprising the rotational angle detector according to claim 5,
wherein a rotational angle of a motor of the electric power steering system is detected by the rotational angle detector.

7. The rotational angle sensor according to claim 2, wherein each of the bridge circuits is a half-bridge circuit.

8. A motor, comprising the rotational angle sensor according to claim 2.

9. A rotational angle detector, comprising:
the rotational angle sensor according to claim 2; and
a detector that detects a rotational angle of a rotary shaft that rotates together with the magnet rotor based on the sensor signals received from the rotational angle sensor,
wherein the detector detects the rotational angle based on three-phase resultant signals derived by averaging the sensor signals of which the phases overlap each other and which are received from the rotational angle sensor.

10. An electric power steering system, comprising the rotational angle detector according to claim 9,
wherein a rotational angle of a motor of the electric power steering system is detected by the rotational angle detector.

* * * * *